(12) United States Patent
Lee (10) Patent No.: US 8,947,539 B2
(45) Date of Patent: Feb. 3, 2015

(54) APPARATUS FOR EVALUATING QUALITY OF VIDEO DATA BASED ON HYBRID TYPE AND METHOD THEREOF

(71) Applicant: Industry-Academic Cooperation Foundation, Yonsei University, Seoul (KR)

(72) Inventor: Chul Hee Lee, Goyang (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 14/194,579

(22) Filed: Feb. 28, 2014

(65) Prior Publication Data

US 2014/0240522 A1 Aug. 28, 2014

(30) Foreign Application Priority Data

Feb. 28, 2013 (KR) ........................ 10-2013-0022002

(51) Int. Cl.
*H04N 17/00* (2006.01)
*H04N 7/26* (2006.01)
(52) U.S. Cl.
CPC .................................. *H04N 17/004* (2013.01)
USPC ..................................... 348/193; 375/240.01
(58) Field of Classification Search
USPC ............. 348/180, 192, 193, 181; 375/240.01, 375/240.26, 240.27, 224, 227; 702/66, 71, 702/81, 84; 714/712, 715, 798, 799, 814, 714/47.1, 25, 37; 382/276, 232, 207, 224; 709/224
See application file for complete search history.

(56) References Cited

U.S. PATENT DOCUMENTS

| | | | |
|---|---|---|---|
| 6,611,608 B1 * | 8/2003 | Wu et al. | 382/100 |
| 6,898,321 B1 * | 5/2005 | Knee et al. | 382/235 |
| 8,718,145 B1 * | 5/2014 | Wang et al. | 375/240.21 |
| 2004/0175056 A1 * | 9/2004 | Lee | 382/286 |
| 2005/0243910 A1 * | 11/2005 | Lee et al. | 375/240.01 |
| 2006/0203916 A1 * | 9/2006 | Chandramouly et al. | 375/240.24 |
| 2007/0216809 A1 * | 9/2007 | Pirzada et al. | 348/582 |
| 2010/0303364 A1 * | 12/2010 | Yamada | 382/201 |
| 2011/0255589 A1 * | 10/2011 | Saunders et al. | 375/240.01 |
| 2012/0008673 A1 * | 1/2012 | Suresh | 375/240.01 |
| 2012/0307915 A1 * | 12/2012 | Clark | 375/240.27 |

FOREIGN PATENT DOCUMENTS

| | | |
|---|---|---|
| KR | 10-2007-0033183 A | 3/2007 |
| KR | 10-2009-0108933 A | 10/2009 |

\* cited by examiner

*Primary Examiner* — Victor Kostak (57) ABSTRACT

The present invention provides an apparatus for evaluating video quality based on a hybrid type which, when bit stream data is received, extracts first evaluation parameters based on the received bit stream data to calculate a preliminary video quality score based on the first extracted evaluation parameters and then extracts second evaluation parameters, and calculates a final video quality score by adjusting the preliminary video quality score based on the second extracted evaluation parameters and methods thereof.

12 Claims, 8 Drawing Sheets
(2 of 8 Drawing Sheet(s) Filed in Color)

APPARATUS FOR EVALUATING QUALITY OF VIDEO DATA BASED ON HYBRID TYPE AND METHOD THEREOF

CROSS-REFERENCE TO RELATED APPLICATIONS

This application claims priority to and the benefit of Korean Patent Application No. 10-2013-0022002 filed in the Korean Intellectual Property Office on Feb. 28, 2013, the entire contents of which are incorporated herein by reference.

TECHNICAL FIELD

The present invention relates to video quality evaluating methods, and particularly to an apparatus for evaluating video quality based on a hybrid type which, when bit stream data is received, extracts first evaluation parameters which are set in advance based on the received bit stream data to calculate a preliminary video quality score based on the extracted first evaluation parameters and then extracts second evaluation parameters which are set in advance to adjust the preliminary video quality score based on the extracted second evaluation parameters to calculate a first final video quality score using adjustments and methods thereof.

BACKGROUND ART

As digital TV such as terrestrial broadcasting, satellite broadcasting, or IPTV becomes widely available, subscribers can watch clear video programs. Unlike analog broadcasting, video quality may be deteriorated while compressing video information in digital broadcasting. As high compression is applied, the video quality of decoded video signals may be degraded. The channel capacity in terrestrial broadcasting and satellite broadcasting is fixed so that the video quality depends only on video encoder performance. However, in IPTV, the channel capacity is not fixed, but may be extendable as necessary. Thus, the encoding bit rate of the content also affects the video quality of decoded signals. Furthermore, various error patterns may occur due to transmission errors.

If the broadcaster monitors video quality which may be perceived by a viewer and uses the results to produce or transmit the content, the broadcaster can build a more efficient broadcasting system and increase the client satisfaction. For this purpose, a method for measuring and evaluating video quality of digital TV is required. Presently, international standardization organizations are currently working on the standardization of objective methods to measure subjective video quality and these methods can be classified into three categories:

1) The full-reference (FR) method computes a similarity or a distortion difference between a source video sequence and a processed video sequence (PVS) to measure relative video quality. Therefore, a level of the processed video quality may be most accurately determined. However, since the receiving side needs a source video sequence which is used at the transmitting side, the application area of the FR method is very restricted.

2) The reduced-reference (RR) method extracts and compares features from the source video sequence and the processed video sequence to measure relative video quality. Therefore, the relative video quality may be measured with a smaller amount of calculation compared with the FR method.

3) The no-reference (NR) method computes video quality only using the processed video sequence without using the source video sequence or feature information. However, the NR method is least accurate since no reference video sequence is used.

However, since the existing video quality measuring methods receive video data, decode the received video data, and then evaluate video quality using the decoded video data, the quality measurement performance is limited and the processing time is rather long.

SUMMARY OF THE INVENTION

The present invention has been made in an effort to provide an apparatus for evaluating video quality of based on a hybrid type which, when bit stream data is received, extracts first evaluation parameters based on the received bit stream data, calculates a preliminary video quality score based on the first extracted evaluation parameters, extracts second evaluation parameters to adjust the preliminary video quality score based on the second extracted evaluation parameters, and calculates a final video quality score by adjusting the preliminary video quality score based on the second extracted evaluation parameters as an adjustment result and methods thereof.

The present invention has been made in an effort to further provide an apparatus for evaluating video quality based on a hybrid type which, when bit stream data is received, extracts first evaluation parameters based on the received bit stream data to calculate a preliminary video quality score based on the first extracted evaluation parameters and then extracts second evaluation parameters to firstly adjust the preliminary video quality score based on the extracted second evaluation parameters and calculate a first final video quality score as a first adjustment result and secondarily adjust the first final video quality score using an edge peak signal to noise ratio (EPSNR) again to calculate a second final video quality score and methods thereof. The EPSNR is computed by using a PVS obtained by decoding the received bit stream data and features extracted from the source video sequence.

The present invention has been made in an effort to further provide an apparatus for evaluating video quality based on a hybrid type which, when bit stream data is received, analyzes a processed video sequence (PVS) obtained by decoding the received bit stream data to calculate an NR type video quality score and combines the NR type video quality score and a video quality score obtained from the bit stream data to calculate a final video quality score and methods thereof.

However, an object of the present invention is not limited to the above description and other objects which have not been mentioned above will be more apparent to those skilled in the art from reading the following description.

An exemplary embodiment of the present invention provides an apparatus for evaluating video quality based on a hybrid type, including: first evaluation parameter extracting means which, when video bit stream data is received, extracts first evaluation parameters which are set in advance based on the received video bit stream data; preliminary video quality score calculating means which calculates a preliminary video quality score using a prediction function which is set in advance based on the extracted first evaluation parameters; second evaluation parameter extracting means which extracts second evaluation parameters which are set in advance based on the received video bit stream data; and a first final video quality score calculating means which calculates a first final video quality score by adjusting the preliminary video quality score, which is calculated, based on the extracted second evaluation parameters as an adjusted result.

The first evaluation parameters may be a feature obtained by applying a log function to the bit rate and a feature obtained by applying the log function to a transmission error rate.

A different set of the first evaluation parameters may include an average QP value of all frames, an average QP value for I frames, and a log error area value, which is produced by transmission errors. For example, when transmission errors occur, the picture may contain erroneous areas.

The second evaluation parameter may include a total number of freezed frames, the length of longest freezed frames, a frame rate, etc.

Desirably, the apparatus further comprises a second final video quality score calculating means which calculates a second final video quality score as a secondary adjustment result by secondarily adjusting the first final video quality score using an edge peak signal to noise ratio (EPSNR).

The apparatus further comprises a second final video quality score calculating means which calculates a second final video quality score as a secondary adjustment result by secondarily adjusting the first final video quality score using an NR video quality score which is obtained by an NR type video quality evaluating method.

The apparatus further comprises video quality degradation measuring means which can measure the video quality deterioration due to transmission errors and then adjust the PVS based video quality score.

Another exemplary embodiment of the present invention provides a method for evaluating video quality based on a hybrid type, comprising: extracting, when video bit stream data is received, first evaluation parameters which are set in advance based on the received video bit stream data; calculating a preliminary video quality score using a prediction function which is set in advance based on the extracted first evaluation parameters; extracting second evaluation parameters which are set in advance based on the received video bit stream data; and calculating a first final video quality score as an adjusted result by adjusting the preliminary video quality score using the extracted second evaluation parameters.

The first evaluation parameters may be a feature obtained by applying a log function to a bit rate and a feature obtained by applying a log function to a transmission error rate.

A different set of the first evaluation parameters may include an average QP value of all frames, an average QP value for I frames, and a log error area value, which is produced by transmission errors.

The second evaluation parameter may include a total number of freezed frames, the length of longest freezed frames, a frame rate, etc.

The method may further comprise calculating a second final video quality score as a secondary adjustment result by secondarily adjusting the first final video quality score using an edge peak signal to noise ratio (EPSNR).

The method may further comprise calculating a second final video quality score as a secondary adjustment result by secondarily adjusting the first final video quality score using an NR video quality score which is obtained by an NR type video quality method.

The method may further comprise adjusting the PVS based video quality by considering video quality reduction due to video quality degradations caused by transmission errors.

Therefore, according to the present invention, when the bit stream data is received, first evaluation parameters are extracted based on the received bit stream data to calculate a preliminary video quality score based on the extracted first evaluation parameters and then second evaluation parameters are extracted to adjust the preliminary video quality score, and a final video quality score is calculated by adjusting the preliminary video quality score based on the extracted second evaluation parameters as an adjusted result so that the video quality score may be accurately predicted.

According to the present invention, video quality is rapidly evaluated before decoding using a plurality of evaluation parameters which are set in advance so that the processing time to evaluate video quality may be shortened.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an apparatus for evaluating video quality based on a hybrid type according to an exemplary embodiment of the present invention and a method thereof will be described with reference to FIGS. 1 to 9. Parts which are required to understand an operation and an effect of the present invention will be mainly described in detail.

In the description of components of an exemplary embodiment of the present invention, a component having the same name may be denoted by a different reference numeral in some drawings but may be denoted by the same reference numeral even in different drawings. However, even in this case, it does not mean that the component has different functions depending on the exemplary embodiment or the components have the same function in the different exemplary embodiments but the function of each of the components may be determined based on the description of the components in the corresponding exemplary embodiment.

Specifically, the present invention presents a new method for evaluating video quality based on a hybrid type which, when the bit stream data is received, extracts first evaluation parameters based on the received bit stream data to calculate a preliminary video quality score based on the extracted first evaluation parameters and then extracts second evaluation parameters, and calculates a final video quality score by adjusting the preliminary video quality score based on the extracted second evaluation parameter as an adjusted result.

In the present invention, first evaluation parameters are extracted based on the received bit stream data to calculate a preliminary video quality score based on the extracted first evaluation parameters, second evaluation parameters are extracted, a first final video quality score is calculated as a first adjustment result by firstly adjusting the preliminary video quality score using the extracted second evaluation parameters, a second final video quality score is calculated by secondarily adjusting the first final video quality score using EPSNR.

Figure 1:
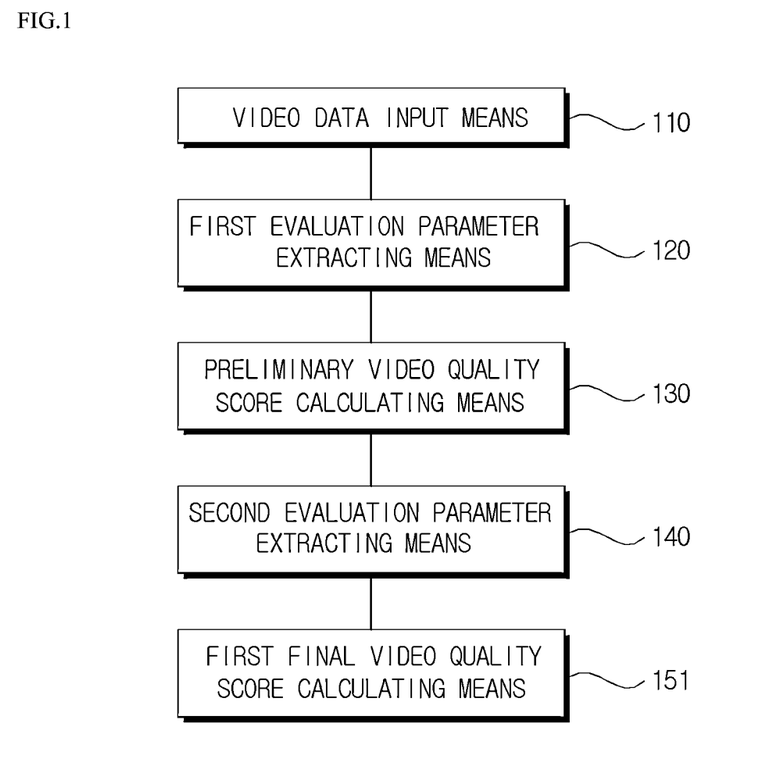
FIG. 1 is a first view illustrating an apparatus for evaluating video quality according to an exemplary embodiment of the present invention.

FIG. 1 is a first view illustrating an apparatus for evaluating video quality according to an exemplary embodiment of the present invention.

As illustrated in FIG. 1, an apparatus for evaluating video quality according to an exemplary embodiment of the present invention comprises video data input means 110, first evaluation parameter extracting means 120, preliminary video quality score calculating means 130, second evaluation parameter extracting means 140, and first final video quality score calculating means 151. Depending on applications, the first final video quality score may be further adjusted by using a video quality score based on processed video sequences (PVSs).

The video data input means 110 may receive video bit stream data in real time.

The first evaluation parameter extracting means 120 may extract first evaluation parameters based on the received video bit stream data. Here, the first evaluation parameters may be a feature obtained by applying a log function to a bit rate and a feature obtained by applying a log function to a transmission error rate.

Another embodiment of the first evaluation parameter extracting means 120 may extract a different set of first evaluation parameters based on the video bit stream data. Here, the first evaluation parameters may be an average QP value of all frames, an average QP value for I frames, and a log error area value, which is produced by transmission errors.

The preliminary video quality score calculating means 130 may calculate the preliminary video quality score using a prediction function which is set in advance based on the extracted first evaluation parameters which include, for example, the feature obtained by applying a log function to the bit rate and the feature obtained by applying a log function to the transmission error rate.

Figure 6:
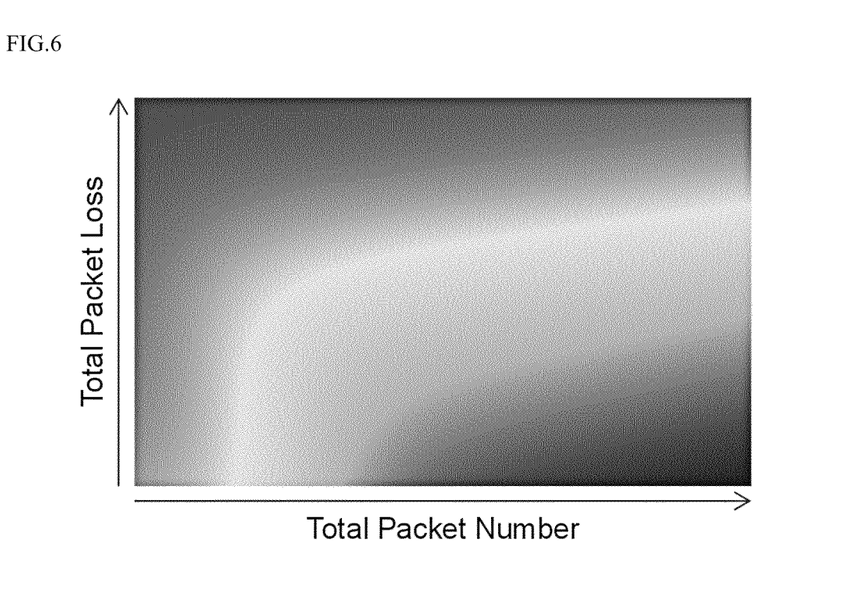
FIG. 6 is a diagram illustrating an example of functions for calculating a preliminary video quality score.

FIG. 6 is a figure illustrating an example of a function of calculating a preliminary video quality score using a feature obtained by applying a log function to a bit rate and a feature obtained by applying a log function to a transmission error rate.

Referring to FIG. 6, generally, a video quality score is monotonically reduced as a total packet number decreases and the video quality score monotonically increases as a total packet loss is reduced. That is, blue indicates good quality and red indicates poor quality. A function is designed, which takes a packet number and a transmission error rate or a packet loss rate as inputs and outputs a score which is distributed between 1 and 5. Such a function can be designed using neural networks or look-up tables. For example, the total number of packets (TotalPacket) can be normalized to be equivalent to TS packets. The total number of lost packets (TotalPacket$_{loss}$) is computed in a similar way. Then, the total packet number (X) is computed as follows:

$$X = \log_{10}(\text{TotalPacket})$$

It is noted that the total packet number is computed by applying a log function to the bit rate (e.g., the total number of packets). The total packet loss (Y) is computed as follows:

$$Y = \log_{10}(\text{TotalPacket}_{LOSS} + 1.0)$$

It is noted that the total packet loss is computed by applying a log function to the transmission error rate (e.g., the total number of lost packets). Then, a preliminary video quality score (vqm$_{enc}$) is calculated as follows:

$$vqm_{enc} = \text{LUT}_{ENC}(X, Y)$$

where LUT is a look-up table, which is shown as a color-coded image in FIG. 6. In other words, the look-up table, which is a two-dimensional array, is shown as a color-coded image (blue indicates a high quality score and red indicates a low quality score). Usually, the loop-table is given as an array and the indexes (X, Y) are floating numbers. Thus, interpolation is necessary to find a value at the given location.

Another embodiment of the first evaluation parameter extracting means 120 may extract a different set of first evaluation parameters based on the video bit stream data. Here, the first evaluation parameters may be an average QP value of all frames, an average QP value for I frames, and a log error area value, which is produced by transmission errors. For example, when transmission errors occur, the picture may contain erroneous areas.

Figure 7:
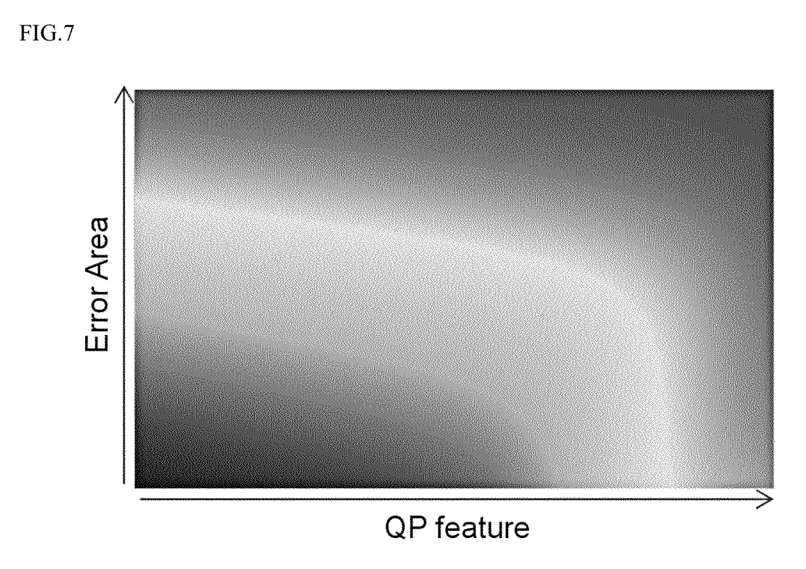
FIG. 7 is a diagram illustrating another example of functions for calculating a preliminary video quality score.

FIG. 7 is a figure illustrating another example of function for calculating a preliminary video quality score using an average QP value of all frames, an average QP value for I frames, and a log error area value.

Referring to FIG. 7, generally, the video quality score is monotonically reduced as the QP value increases and the video quality score monotonically increases as the error area is reduced. That is, blue indicates good quality and red indicates poor quality. The error area (ErrorArea) of FIG. 7 is obtained by applying a log function to the normalized total error area (NormalizedTotalErrorArea), which are produced by transmission errors. In other words, the normalized total error area is computed by adjusting the total error area of all frames by considering the image size and the number of frames.

In video coding, a coded compression bit stream has an important parameter related with video quality, which is called a quality parameter (QP). QP is a parameter which adjusts a quantization step in an encoder. If the QP value is large, the quantization step is large and video quality decreases. If the QP value is small, video quality increases due to a small quantization step.

Among QP values, the QP of I frames directly affects video quality more than the QP values of P frames or B frames. Thus, the total QP value ($QP_{AVE}$) and the QP value ($QP_I$) of I frames are simultaneously considered to be used as a video quality measurement feature ($Feature_{QP}$) as described below in Equation 1:

$$Feature_{QP} = QP_I + QP_{AVE} \quad \text{[Equation 1]}$$

Then, using a look-up table, which is shown as a color-coded image in FIG. 7, a video quality score ($vqm_{non\text{-}enc}$) can be computed as follows:

$$vqm_{non\text{-}enc} = LUT_{NON\text{-}ENC}(Feature_{QP}, ErrorArea)$$

where $ErrorArea = \log 10(Normalized\ TotalError\ Area + 1)$.

The second evaluation parameters may include a total number of freezed frames, the length of longest freezed frames, a frame rate, etc.

The first final video quality score calculating means 151 calculates the final video quality score as an adjusted result by adjusting the preliminary video quality score, which is calculated before, using at least one of the extracted second evaluation parameters: the total number of freezed frames, the length of longest freezed frames, the frame rate, etc. The computation method of the first final video quality score calculating means 151 will be described later.

Figure 2:
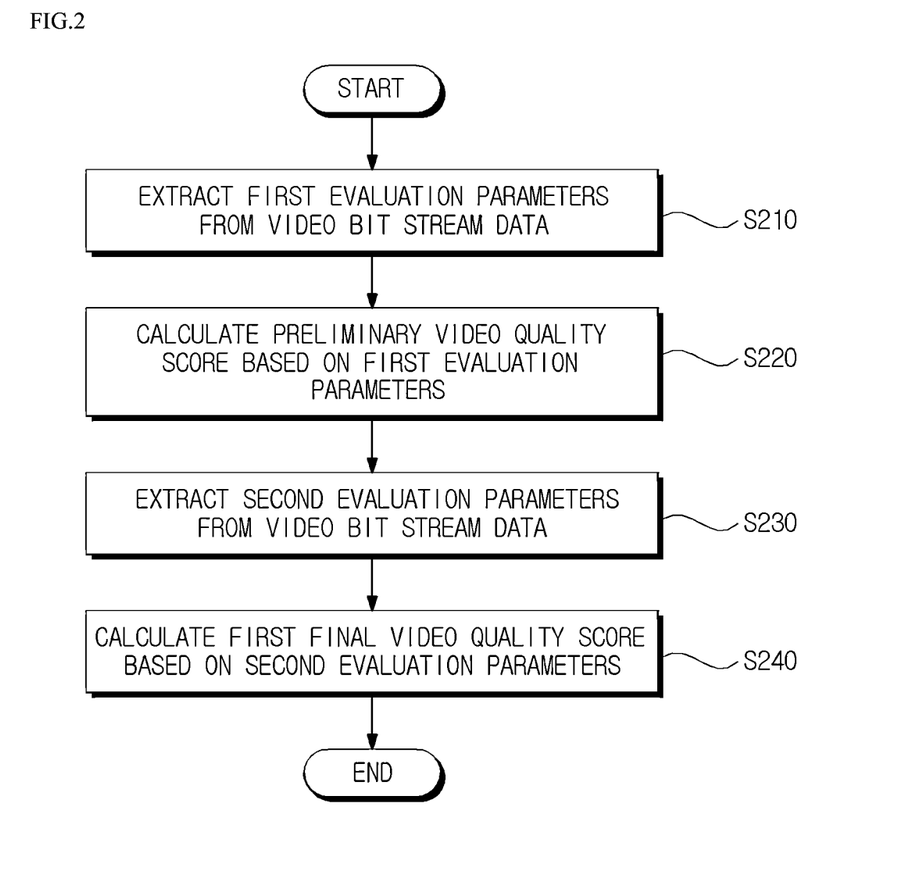
FIG. 2 is a first view illustrating a method for evaluating video quality according to an exemplary embodiment of the present invention.

FIG. 2 is a first view illustrating a method for evaluating video quality according to an exemplary embodiment of the present invention.

As illustrated in FIG. 2, when video bit stream data is received in real time, an apparatus (hereinafter, called as an evaluation apparatus) for evaluating video quality according to an exemplary embodiment of the present invention may extract first evaluation parameters which are set in advance based on the received video bit stream data in step S210.

Next, the evaluation apparatus calculates a preliminary video quality score using a prediction function which is set in advance based on the extracted first evaluation parameters in step S220. Depending on application, a different set of parameters can be used. For example, when the bit stream is encrypted, the extracted first evaluation parameters may include a feature obtained by applying a log function to the bit rate and a feature obtained by applying a log function to the transmission error rate. When the bit stream is not encrypted, the extracted first evaluation parameters may include an average QP value of all frames, an average QP value for I frames, and a log error area value, which is produced by transmission errors.

Next, the evaluation apparatus extracts second evaluation parameters based on the video bit stream data after the preliminary video quality score is calculated in step S230.

Next, the evaluation apparatus calculates a first final video quality score as an adjusted result by adjusting the preliminary video quality score using the extracted second evaluation parameters in step S240.

Figure 3:
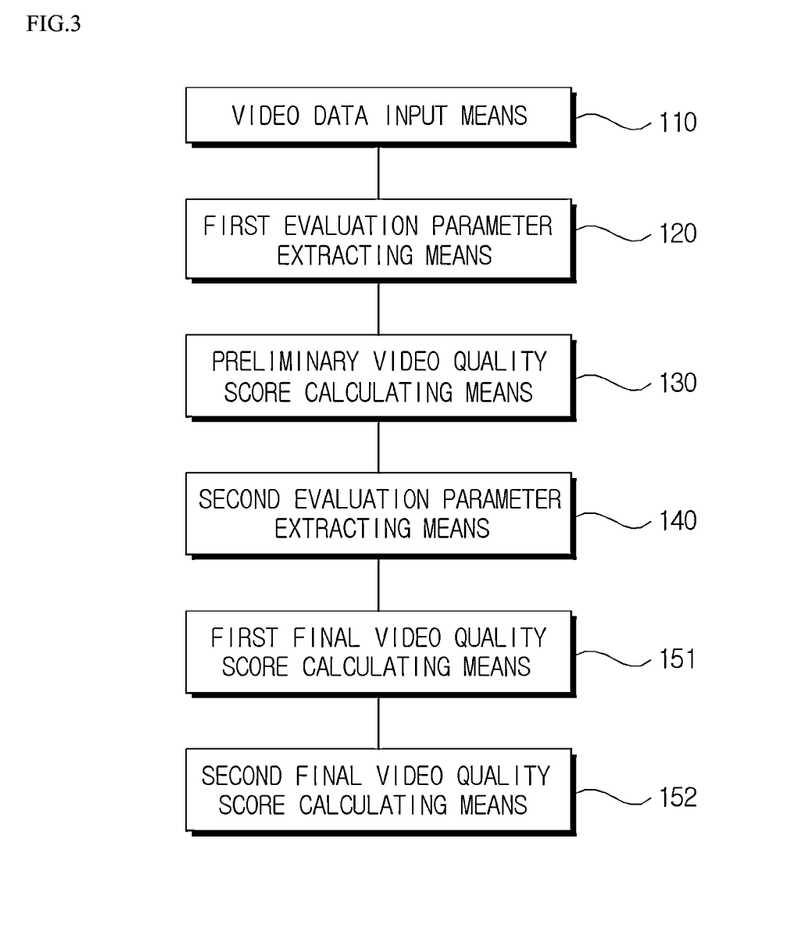
FIG. 3 is a second view illustrating an apparatus for evaluating video quality according to an exemplary embodiment of the present invention.

FIG. 3 is a second view illustrating an apparatus for evaluating video quality according to an exemplary embodiment of the present invention.

As illustrated in FIG. 3, an apparatus for evaluating video quality according to an exemplary embodiment of the present invention comprises video data input means 110, first evaluation parameter extracting means 120, preliminary video quality score calculating means 130, second evaluation parameter extracting means 140, first final video quality score calculating means 151 and second final video quality score calculating means 152.

The video data input means 110 may receive video bit stream data in real time.

The first evaluation parameter extracting means 120 may extract first evaluation parameters based on the received video bit stream data. Here, the first evaluation parameters may be a feature obtained by applying a log function to a bit rate and a feature obtained by applying a log function to a transmission error rate as explained previously.

The preliminary video quality score calculating means 130 may calculate the preliminary video quality score using a prediction function which is set in advance based on the extracted first evaluation parameters, which include, for example, the feature obtained by applying a log function to the bit rate and the feature obtained by applying a log function to the transmission error rate as explained previously.

The first evaluation parameter extracting means 130 may extract a different set of first evaluation parameters based on the video bit stream data. Here, the second evaluation parameter may be a total average QP value, a QP value for I frames, a log error area value, etc., as explained previously.

The second evaluation parameter extracting means 140 may extract second evaluation parameters based on the video bit stream data. Here, the second evaluation parameters may include a total number of freezed frames, the length of longest freezed frames, a frame rate, etc. The first final video quality score calculating means 151 may calculate a first final video quality score as a first adjustment result by firstly adjusting the preliminary video quality score using at least one of the extracted second evaluation parameters, which include the total number of freezed frames, the length of longest freezed frames, the frame rate, etc. The first final video quality score calculating means 151 will be described in detail later.

When the first final video quality score is calculated, the second final video quality score calculating means 152 may calculate a second final video quality score as a secondary adjustment result by secondarily adjusting the calculated first final video quality score using an edge peak signal to noise ratio (EPSNR), which computes degradation in edge areas. In other words, EPSNR computes a peak signal to noise ratio in edge areas.

Also, the second final video quality score calculating means 152 may secondarily adjust the first final video quality score which is calculated by an NR method using EPSNR. However, the present invention is not necessarily limited thereto and the secondary correction may be performed using structural similarity score measure (SSIM), etc. Depending on applications, this second final video quality score calculating routine may be skipped.

Figure 4:
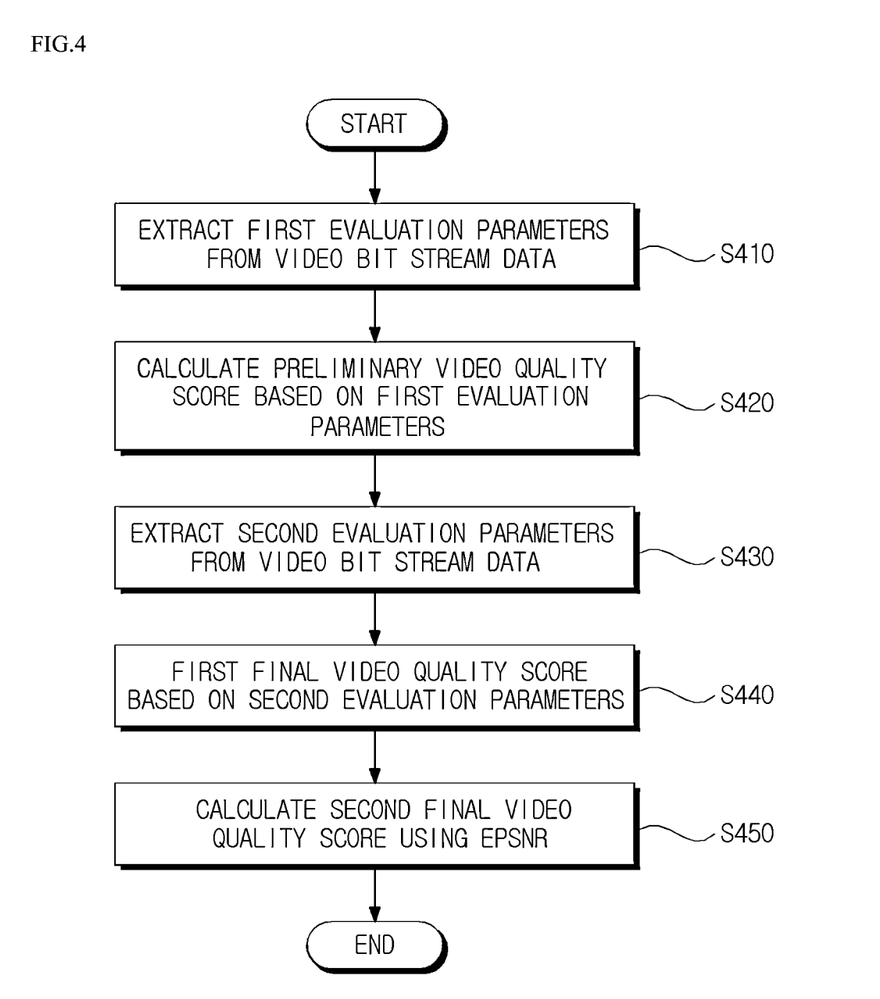
FIG. 4 is a second view illustrating a method for evaluating video quality according to an exemplary embodiment of the present invention.

FIG. 4 is a second view illustrating a method for evaluating video quality according to an exemplary embodiment of the present invention.

As illustrated in FIG. 4, when video bit stream data is received in real time, an apparatus (hereinafter, called as an evaluation apparatus) for evaluating video quality according to an exemplary embodiment of the present invention may extract first evaluation parameters which are set in advance based on the received video bit stream data in step S410.

Next, the evaluation apparatus may calculate a preliminary video quality score using a prediction function which is set in advance based on the extracted first evaluation parameters in step S420.

Next, the evaluation apparatus may extract second evaluation parameters based on the video bit stream data in step S430 after the preliminary video quality score is calculated.

Next, the evaluation apparatus may calculate a first final video quality score as a first adjustment result by firstly adjusting the preliminary video quality score using the extracted second evaluation parameters in step S440.

Next, the evaluation apparatus may finally calculate a second final video quality score as a secondary adjustment result by secondarily adjusting the calculated first final video quality score using the EPSNR in step S450.

In this case, if information on the source video sequence is not provided, EPSNR may not be calculated. In this case, a received PVS is used to calculate an NR type video quality score and the NR video quality score is combined with a video quality score which is previously calculated using the bit stream to produce the final video quality score.

It is obvious that the video quality score can be additionally adjusted by considering freezed frames.

In some cases, images are first reduced and then encoded, and the decoder outputs enlarged images. In this case, the video quality score needs to be adjusted by considering the resizing factor. When a width and a height are reduced to ½ assuming that the source video size is 1 in each direction (i.e., the reduction ratio is 0.5), the video quality may be degraded in proportion to the reduction ratio. Thus, a function which monotonically increases in accordance with the reduction ratio is used to adjust the video quality score.

It is also possible to calculates a final video quality score by combining a bit stream based video quality score which is previously computed and a video quality score which is additionally calculated by evaluating video quality based on a processed video sequence (PVS). In the PVS based video quality evaluating methods, the video quality score may be calculated using an FR, an RR or an NR method.

Figure 5:
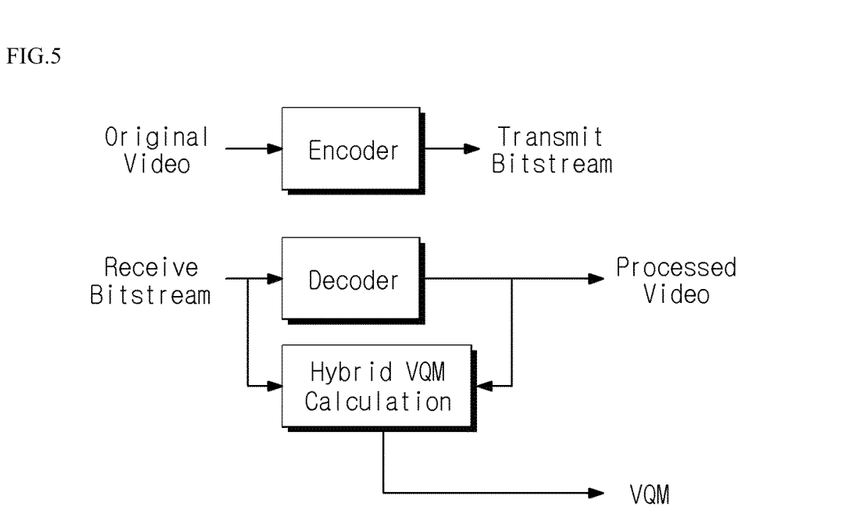
FIG. 5 is a diagram illustrating a system for evaluating video quality according to an exemplary embodiment of the present invention.

FIG. 5 is a diagram illustrating a system for evaluating video quality according to an exemplary embodiment of the present invention.

Referring to FIG. 5, it is possible to calculates a final video quality score by combining a bit stream based video quality score which is previously computed and a video quality score which is additionally calculated by evaluating video quality based on a processed video sequence (PVS). In the PVS based video quality evaluating method, the video quality score may be calculated using an FR, an RR or an NR method. That is, a hybrid video quality evaluating method according to the present invention may use the bit stream data as well as the PVS, and may further use a feature extracted from the source video sequence if necessary.

Here, the PVS represents non-compressed video signals (raw video signals) which is sent from the decoder to the display.

Figure 8:
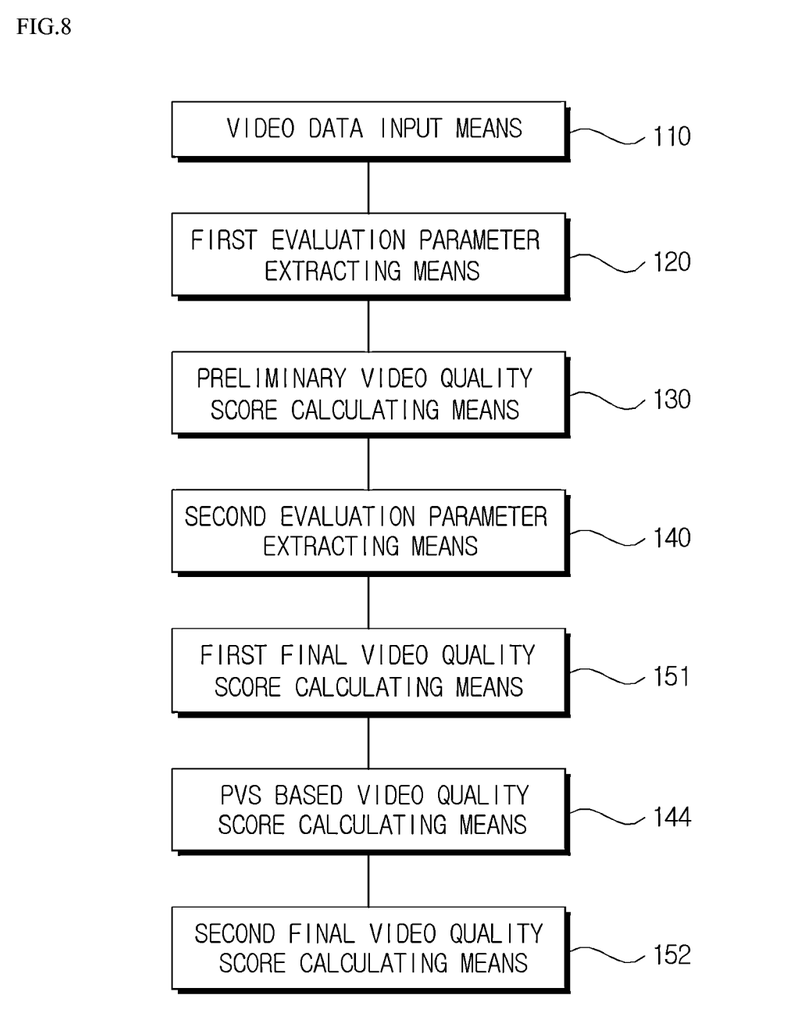
FIG. 8 is a third view illustrating an apparatus for evaluating video quality according to an exemplary embodiment of the present invention.

FIG. 8 is a third view illustrating an apparatus for evaluating video quality according to an exemplary embodiment of the present invention.

As illustrated in FIG. 8, an apparatus for evaluating video quality according to an exemplary embodiment of the present invention comprises video data input means 110, first evaluation parameter extracting means 120, preliminary video quality score calculating means 130, second evaluation parameter extracting means 140, first final video quality score calculating means 151, PVS based video quality score calculating means 144, and second final video quality score calculating means 152.

The first evaluation parameter extracting means 120 extracts first evaluation parameters based on the received video bit stream data. Here, the first evaluation parameters may be a feature obtained by applying a log function to a bit rate and a feature obtained by applying a log function to a transmission error rate, as explained previously.

The preliminary video quality score calculating means 130 can calculate the preliminary video quality score using a prediction function which is set in advance based on the extracted first evaluation parameters, which, for example, include the feature obtained by applying the log function to the bit rate and the feature obtained by applying the log function to the transmission error rate. A different set of the first evaluation parameters may include an average QP value of all frames, an average QP value for I frames, and a log error area value, which is produced by transmission errors. In other words, depending on application, a different set of parameters can be used. For example, when the bit stream is encrypted, the first evaluation parameters may include the feature obtained by applying a log function to the bit rate and the feature obtained by applying a log function to the transmission error rate. When the bit stream is not encrypted, the extracted first evaluation parameters may include an average QP value of all frames, an average QP value for I frames, and a log error area value.

The second evaluation parameter extracting means 140 may extract second evaluation parameters based on the video bit stream data after the preliminary video quality score is calculated. Here, the second evaluation parameters may include a total number of freezed frames, the length of longest freezed frames, a frame rate, etc.

The first final video quality score calculating means 151 may adjust a preliminary video quality score, which is calculated before, based on at least one of the extracted second evaluation parameters, which include, for example, the total number of freezed frames, the length of longest freezed frames, the frame rate, etc. The first final video quality score calculating means 151 will be described in detail later.

The PVS based video quality score calculating means 144 may perform PVS based video quality evaluation to calculate a PVS based video quality score. The PVS based video quality score, which is obtained by performing the PVS based video quality evaluation as illustrated in FIG. 8, may be calculated using FR, RR, or NR methods. The EPSNR is an RR method.

The second final video quality score calculating means 152 may calculate the final video quality score by combining the PVS based video quality score and the video quality score which is calculated using the bit stream data.

For example, the second final video quality score calculating means 152 can calculate the final video quality score by using a PVS based video quality score ($vqm_{PVS\ based}$) and the bit stream based video quality score ($vqm_{bit\ stream\ based}$) as indicated in the following Equation 2:

$$vqm_{2nd\ final} = \frac{1}{2}[vqm_{bit\ stream\ based} + vqm_{PVS\ based}]. \quad \text{[Equation 2]}$$

Also, when the bit stream based video quality score is 0.5 or smaller than the NR quality score and the NR video quality score is larger than a predetermined value, the first final video quality score may be calculated by averaging the NR video quality score and the bit stream based video quality score. For example, this procedure can be done when the bit stream data is encrypted FIG. 9 is a fourth view illustrating an apparatus for evaluating video quality according to an exemplary embodiment of the present invention.

Figure 9:
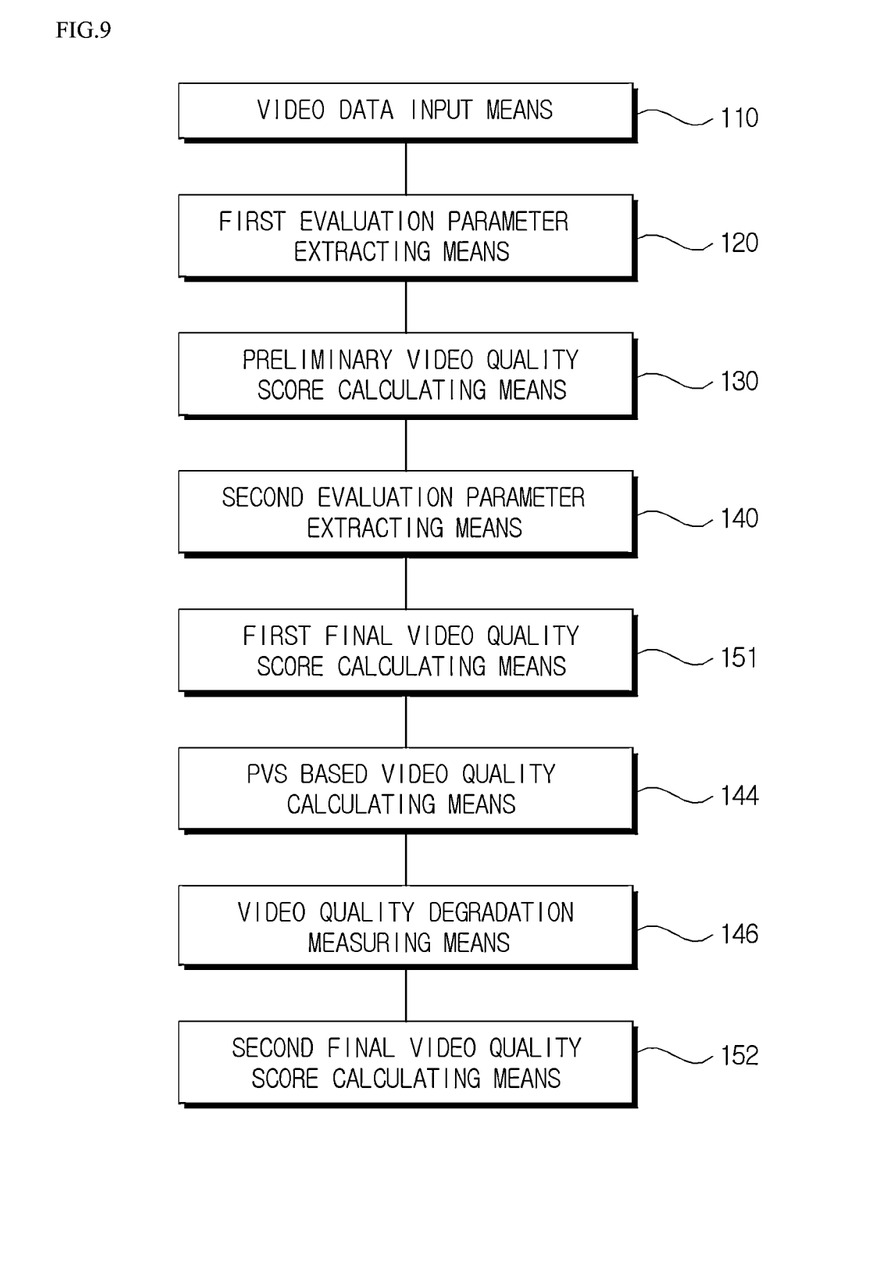
FIG. 9 is a fourth view illustrating an apparatus for evaluating video quality according to an exemplary embodiment of the present invention.

As illustrated in FIG. 9, an apparatus for evaluating video quality according to an exemplary embodiment of the present invention comprises video data input means 110, first evaluation parameter extracting means 120, preliminary video quality score calculating means 130, second evaluation parameter extracting means 140, first final video quality score calculating means 151, PVS based video quality score calculating means 144, video quality degradation measuring means 146 which measures degradations produced by transmission errors, and second final video quality score calculating means 152.

The first evaluation parameter extracting means 120 may extract first evaluation parameters based on the received video bit stream data. Here, the first evaluation parameters may be a feature obtained by applying a log function to a bit rate and a feature obtained by applying a log function to a transmission error rate.

The preliminary video quality score calculating means 130 may calculate the preliminary video quality score using a prediction function which is set in advance based on the extracted first evaluation parameters, which include, for example, the feature obtained by applying the log function to the bit rate, and the feature obtained by applying the log function to the transmission error rate.

The first evaluation parameter extracting means 130 may extract a different set of first evaluation parameters based on the video bit stream data, which may include an average QP value of all frames, an average QP value for I frames, and a log error area value, which is produced by transmission errors.

The second evaluation parameter extracting means 140 may extract second evaluation parameters based on the video bit stream data. Here, the second evaluation parameters may include a total number of freezed frames, the length of longest freezed frames, a frame rate, etc. The first final video quality score calculating means 151 may adjust the preliminary video quality score, which is calculated before, based on at least one of the extracted second evaluation parameters, which include, for example, the total number of freezed frames, the length of longest freezed frames, the frame rate, etc.

The PVS based video quality score calculating means 144 may perform PVS based video quality evaluation to calculate a PVS based video quality score. The PVS based video quality score, which is obtained by performing PVS based video quality evaluation as illustrated in FIG. 9, may be calculated using FR, RR, or NR methods.

The video quality degradation measuring means 146 can measure the video quality deterioration due to transmission errors and then adjust the PVS based video quality score.

Various degradations may generally occur due to transmission errors. The transmission error degradations occur in various forms such as freezed frames, block errors, mono color (green, red, or blue) error blocks, etc.

The first final video quality score calculating means 151 calculates the final video quality score by reflecting the video quality score reduction due to the video quality degradations due to the transmission errors into the preliminary video quality score ($vqm_{enc}$ or $vqm_{non\_enc}$). For example, the number of green blocks is computed to adjust the preliminary video quality score as shown in the following Equation 3:

if (GreenBlk>1.0)$vqm$=MIN($vqm$,1.6)

else if (GreenBlk>0.0)$vqm$=MIN($vqm$,2.5)  [Equation 3]

where vqm is $vqm_{enc}$ or $vqm_{non-enc}$, greenblk is a number of green blocks (or equivalent color blocks) due to transmission errors.

In mobile multimedia transmissions, the frame rate may be adjusted for transmission. Therefore, the final video quality score can be calculated by adjusting the video quality score by considering the frame rate (fps). For example, the correction may be performed as indicated in the following Equation 4:

if (fps<6)$vqm$=MIN($vqm$,3.2)

else if (fps<10)$vqm$=MIN($vqm$,3.5)  [Equation 4]

When transmission error occur, freezed frames may occur, which causes video quality degradations. Therefore, the final video quality score can be calculated by adjusting the preliminary video quality score by considering freezed frames. For example, the adjustment may be performed as follows: For instance, the video quality score may be adjusted as shown in the following Equation 5 in consideration of the total number of freezed frames ($FRZ_{total}$) which are produced in the received video, a length of the longest freeze, and the occurrence number of freezes:

$$FRZ_{log} = \log_{10}(FRZ_{Total} + 1.0)$$  [Equation 5]

if ($FRZ_{log} > 1.3$)

{

$$FRZ_{log} = \text{MIN}(FRZ_{log}, 2.3)$$

$$vqm_{FRZ} = 4 - \log_{10}(FRZ_{log} - 1.3 + 1) \times 3.8$$

$$vqm = \text{MIN}(vqm, vqm_{FRZ})$$

}

When the frame rate is reduced in some multimedia applications, identical frames will be repeated, which are different from freezed frames. In this case, the video quality score may be adjusted as follows:

$$FRZ_{temp} = FRZ_{Total} - \left(1 - \frac{FPS}{OriginalFPS}\right) \times OriginalFPS \times VideoSec$$

$$FRZ_{log} = \log_{10}(FRZ_{temp} + 1.0)$$

if ($FRZ_{log} > 1.3$)

{

$$FRZ_{log} = \text{MIN}(FRZ_{log}, 2.3)$$

$$vqm_{FRZ} = 4 - \log_{10}(FRZ_{log} - 1.3 + 1) \times 3.8$$

$$vqm = \text{MIN}(vqm, vqm_{FRZ})$$

} where OriginalFPS is the frame rate of the original video sequence and VideoSec is the length of the video sequence in seconds.

In some cases, the image is reduced and encoded. Then the decoder decodes the coded data and outputs an enlarged image. In this case, the video quality score needs to be adjusted by considering the reduction rate. For example, the adjustment may be performed considering the reduction rate as follows:

$$vqm_{reduction-adjusted} = \text{MIN}(vqm, \alpha \log 10(vqm)+1)$$  [Equation 6]

where $\alpha$ is a constant which depends on the reduction ratio.

The video quality degradation measuring means 146 can adjust the PVS based video quality score by considering the video quality deterioration due to transmission errors. For example, EPSNR can be first adjusted as follows:

$$EPSNR = \text{MIN}(EPSNR, 42)$$

$$EPSNR = \text{MAX}(EPSNR, 23)$$

-continued $$vqm_{EPSNR} = \frac{3}{19}(EPSNR - 23) + 1.4$$

if $(ErrorRate > 0.01)$ $$vqm_{EPSNR} = vqm_{EPSNR} - 1$$

if $(FRZ_{MAX} > 100)$ $$vqm_{EPSNR} = MIN(vqm_{EPSNR}, 2.2)$$

if $(FRZ_{MAX} > 50)$ $$vqm_{EPSNR} = MIN(vqm_{EPSNR}, 2.5)$$

if $(FRZ_{Total} > 100)$ $$vqm_{EPSNR} = MIN(vqm_{EPSNR}, 2.5)$$

if $(FRZ_{Total} > 60)$ $$vqm_{EPSNR} = MIN(vqm_{EPSNR}, 3.0)$$

if $(FRZ_{NUM} > 12)$ $$vqm_{EPSNR} = MIN(vqm_{EPSNR}, 2.5)$$

where $FRZ_{MAX}$ is a length of the longest freeze, $FRZ_{NUM}$ is a number of freeze occurrences. ErrorRate is computed as follows:

$$ErrorRate = \frac{N_{number\ of\ lost\ packets}}{N_{number\ of\ received\ packets} + N_{number\ of\ lost\ packets}}.$$

When error areas can be calculated, the error area ratio can be used to additionally adjust the video quality score.

By considering to the error area in a video sequence when the bit stream data is not encrypted, the quality score is adjusted as shown in the following Equation 7:

if $(ErrorArea>20) vqm_{EPSNR}=MIN(vqm_{EPSNR},1.5)$ else if $(ErrorArea>10) vqm_{EPSNR}=MIN(vqm_{EPSNR},2.0)$ else if $(ErrorArea>5) vqm_{EPSNR}=MIN(vqm_{EPSNR},3.0)$ [Equation 7]

As described above, the exemplary embodiments have been described and illustrated in the drawings and the specifications. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for evaluating video quality based on a hybrid type, the apparatus comprising a processor and a non-transitory computer readable medium, wherein the processor executes computer program instructions embodied in the non-transitory computer readable medium to perform the steps of:
   when video bit stream data is received, extracting first evaluation parameters from the received video bit stream data;
   calculating a preliminary video quality score using a prediction function which is set in advance using the extracted first evaluation parameters;
   extracting second evaluation parameters from the received video bit stream data; and
   calculating a first final video quality score by adjusting the preliminary video quality score using the extracted second evaluation parameters
   wherein the first evaluation parameters comprise a feature value obtained by applying a log function to a bit rate and a feature value obtained by applying a log function to a transmission error rate.

2. The apparatus of claim 1, wherein the first evaluation parameters comprise a total average QP value, a QP value for I frames, and a log error area value.

3. The apparatus of claim 1, wherein the second evaluation parameters comprise a feature value obtained by applying a log function to a total number of frozen frames, a feature value obtained by applying a log function to the length of longest frozen frames, and a frame rate.

4. The apparatus of claim 1, further comprising:
   calculating a second final video quality score by secondarily adjusting the first final video quality score using an edge peak signal to noise ratio (EPSNR).

5. The apparatus of claim 1, further comprising:
   calculating a second final video quality score by secondarily adjusting the first final video quality score using an NR video quality score which is obtained by an NR type video quality evaluating method.

6. The apparatus of claim 4, further comprising:
   adjusting the EPSNR by considering video quality reduction due to transmission error degradations before adjusting the first final video quality score using the EPSNR.

7. A computer-implemented method for evaluating video quality based on a hybrid type, comprising:
   (a) extracting, when video bit stream data is received, first evaluation parameters which are set in advance based on the received video bit stream data;
   (b) calculating a preliminary video quality score using a prediction function which is set in advance using the extracted first evaluation parameters;
   (c) extracting second evaluation parameters which are set in advance based on the received video bit stream data; and
   (d) calculating a first final video quality score by adjusting the preliminary video quality score using the extracted second evaluation parameters,
   wherein the first evaluation parameters comprise a feature value obtained by applying a log function to a bit rate and a feature value obtained by applying a log function to a transmission error rate.

8. The method of claim 7, wherein the first evaluation parameter comprises a total average QP value, a QP value for I frames, and a log error area value.

9. The method of claim 7, wherein the second evaluation parameter comprises a feature value obtained by applying a log function to a total number of frozen frames, a feature value obtained by applying a log function to the length of longest frozen frames, and a frame rate.

10. The method of claim 7, further comprising:
(e) calculating a second final video quality score by secondarily adjusting the first final video quality score using an edge peak signal to noise ratio (EPSNR).

11. The method of claim 7, further comprising:
(e) calculating a second final video quality score by secondarily adjusting the first final video quality score using an NR video quality score which is obtained by an NR type video quality evaluating method.

12. The method of claim 7, further comprising:
(e) calculating a second final video quality score by secondarily adjusting the first final video quality score using an adjusted edge peak signal to noise ratio (EPSNR) which is adjusted by considering video quality reduction due to transmission error degradations.

* * * * *